United States Patent
Iizuka et al.

(10) Patent No.: US 6,561,909 B1
(45) Date of Patent: May 13, 2003

(54) GAME IN WHICH TELEPHONE SIGNALS ACT AS SEMAPHORES SIGNALING GAME MOVES

(75) Inventors: Takashi Iizuka, Tokyo (JP); Shun Nakamura, Tokyo (JP)

(73) Assignee: Sega Enterprises, Ltd. (JP)

( * ) Notice: Subject to any disclaimer, the term of this patent is extended or adjusted under 35 U.S.C. 154(b) by 164 days.

(21) Appl. No.: 09/686,941

(22) Filed: Oct. 12, 2000

(30) Foreign Application Priority Data

Oct. 14, 1999 (JP) .......................................... 11-291848

(51) Int. Cl.[7] ................................................ A63F 13/10
(52) U.S. Cl. .......................................... 463/41; 463/40
(58) Field of Search ............................... 463/40, 41, 14

(56) References Cited

U.S. PATENT DOCUMENTS

| | | | | |
|---|---|---|---|---|
| 5,827,120 A | * | 10/1998 | Kikuchi et al. | 463/31 |
| 6,213,871 B1 | * | 4/2001 | Yokoi | 273/460 |
| 6,213,873 B1 | * | 4/2001 | Gasper et al. | 345/473 |
| 6,227,966 B1 | * | 5/2001 | Yokoi | 446/143 |
| 6,264,562 B1 | * | 7/2001 | McSheffrey et al. | 463/42 |
| 6,320,868 B1 | * | 11/2001 | Okano et al. | 370/310 |

OTHER PUBLICATIONS

Internet Chess Club Website, http://www.chesclub.com/newcomer.html.*

* cited by examiner

Primary Examiner—Jessica Harrison
Assistant Examiner—Corbett B Coburn
(74) Attorney, Agent, or Firm—Dickstein Shapiro Morin & Oshinsky LLP

(57) ABSTRACT

When an event is generated in a game progressing in a first game device, the first game device sends a call signal to a second game device through network. When the second game device receives the call signal, an event is generated in the game progressing in the second game device. In this way, an event is accidentally generated independently from the progress of the game when the game device receives a telephone call signal, in addition to a spontaneous event which is generated according to the progress of the game. Therefore, the user of the game can experience enjoyment which an ordinary game cannot provide, or a thrill which no one can predict will happen. After transmitting/receiving the call signal, the telephone call is cut-off before the game devices enter communication status, so a communication cost is not charged. Since the cost for communication is free, the user can enjoy a communication game at low cost.

20 Claims, 4 Drawing Sheets

GAME IN WHICH TELEPHONE SIGNALS ACT AS SEMAPHORES SIGNALING GAME MOVES

BACKGROUND OF THE INVENTION

1. Field of the Invention

The present invention relates to a communication game method between a plurality of game devices connected via a communication line (network), and more particularly to a communication game method for which communication cost is free.

2. Description of the Related Art

In a conventional communication game, when some game data is transmitted from a game device to another game device, the game device enters communication status with a server. The game device sends the data to the server, and the server sends the received data to the other game device. In the case of a one-to-one communication game, a game device enters communicating status with another game device and directly sends the data to the other game device.

In the above case, each game device must enter, communicating status with a server or another game device to send data, so a telephone charge (communication charge) is charged during the communicating status.

The user of the communication game must pay this telephone charge. So, in order to popularize the communication game, the telephone charge charged for a communication game must be decreased as much as possible. In other words, providing a communication game for which a telephone charge is minimized is demanded.

SUMMARY OF THE INVENTION

With the foregoing in view, it is an object of the present invention to provide a communication game method which allows enjoying communication games free of telephone charges.

According to a communication method of the present invention, to achieve the above object, when an event is generated in a game progressing in a first communicable game device, the first game device sends a call signal to a second communicable game device. When the second game device receives the call signal, an event is generated in the game progressing in the second game device.

In this way, an event is accidentally generated independently from the progress of the game when the game device receives a telephone call signal, in addition to a spontaneous event which is generated according to the progress of the game. Therefore, the user of the game can experience enjoyment which an ordinary game cannot provide, or a thrill which no one can predict will happen.

After transmitting/receiving the call signal, the telephone call is cut-off before the game devices enter communication status, so a communication cost is not charged. Since the cost for communication is free, the user can enjoy a communication game at low cost.

The communication game of the present invention to achieve the above object preferably comprises a step for receiving a call signal from a different game device and a step for generating an event to a game that is progressing based on the reception of the call signal.

The above communication game method preferably further comprises a step for transmitting a call signal to a different game device when an event is generated to the progressing game.

The above communication game method preferably further comprises a step for acquiring a telephone number of a game device to be the destination to send the call signal. If telephone numbers of a plurality of game devices are acquired in the above acquisition step, the call signal is sent to an arbitrary game device selected from the plurality of game devices in the above transmission step.

If a plurality of events are set, an arbitrary event selected from the plurality of events is generated in the above generation step. Or, one of the plurality of events is selected based on the information included in the received call signal. In this case, the information included in the call signal is, for example, a telephone number of the transmission origination game device.

Also in the present invention, a computer program product including a recording medium storing a communication game program for the game device to execute the above mentioned communication game method is provided. Further the game device that executes the communication game method is provided.

DESCRIPTION OF THE PREFERRED EMBODIMENTS

Embodiments of the present invention will now be described The technical scope of the present invention, however, is not restricted by the embodiments.

Figure 1:
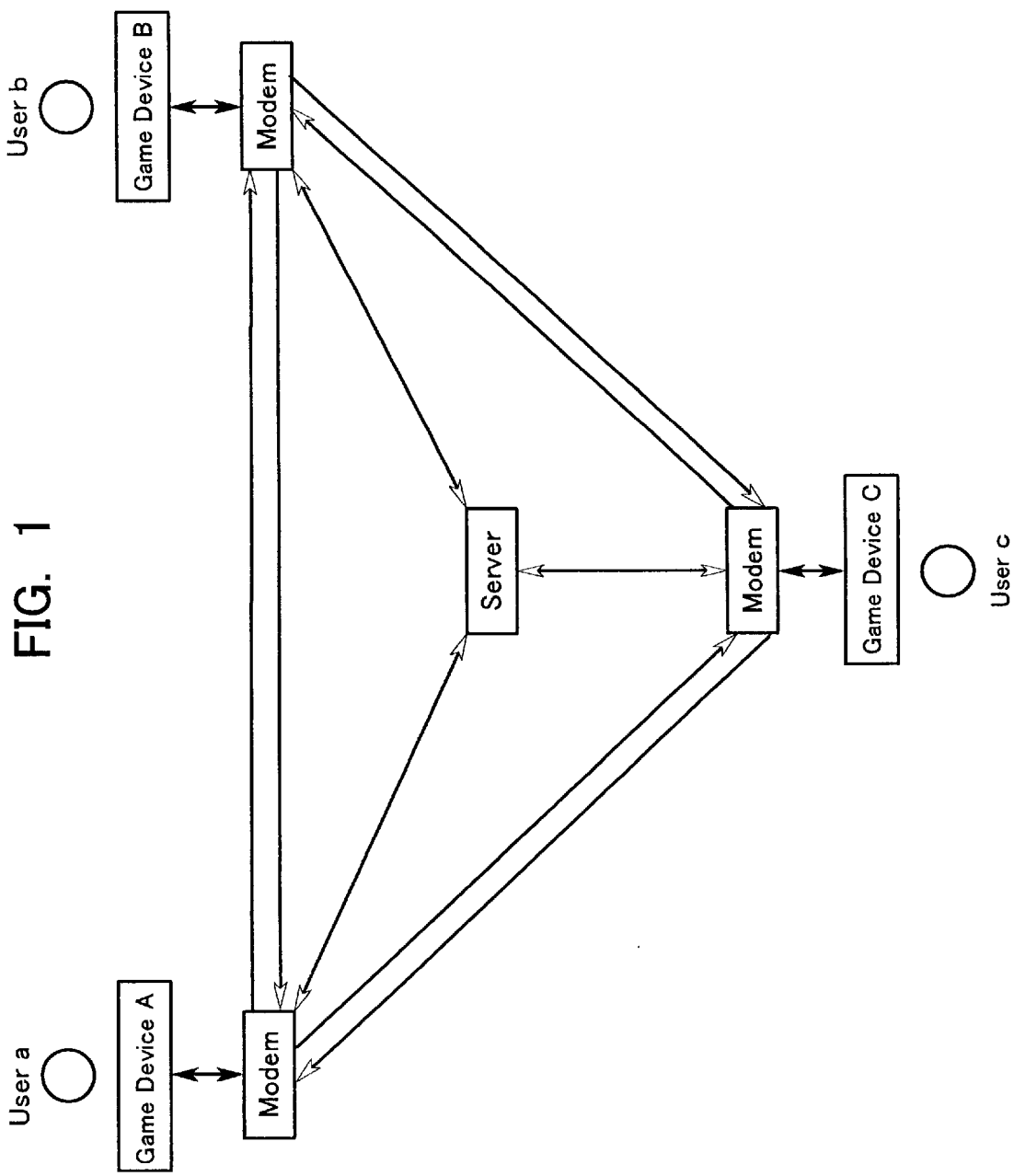
FIG. 1 is a diagram depicting a communication network where a communication game method in accordance with an embodiment of the present invention is executed.

FIG. 1 is a diagram depicting a communication network of a communication game method in accordance with an embodiment of the present invention. In FIG. 1, computer game devices (hereafter "devices") A, B and C operated by users a, b and c respectively can communicate with a server or other devices via respective modems. The server is a computer equipment to manage the communication game. Each device places a telephone call to the server or another device (communication partner) to call up a communication partner, and when the communication partner (server or another device) responds, the devices or the device and the server enter communicating status.

Figure 2:
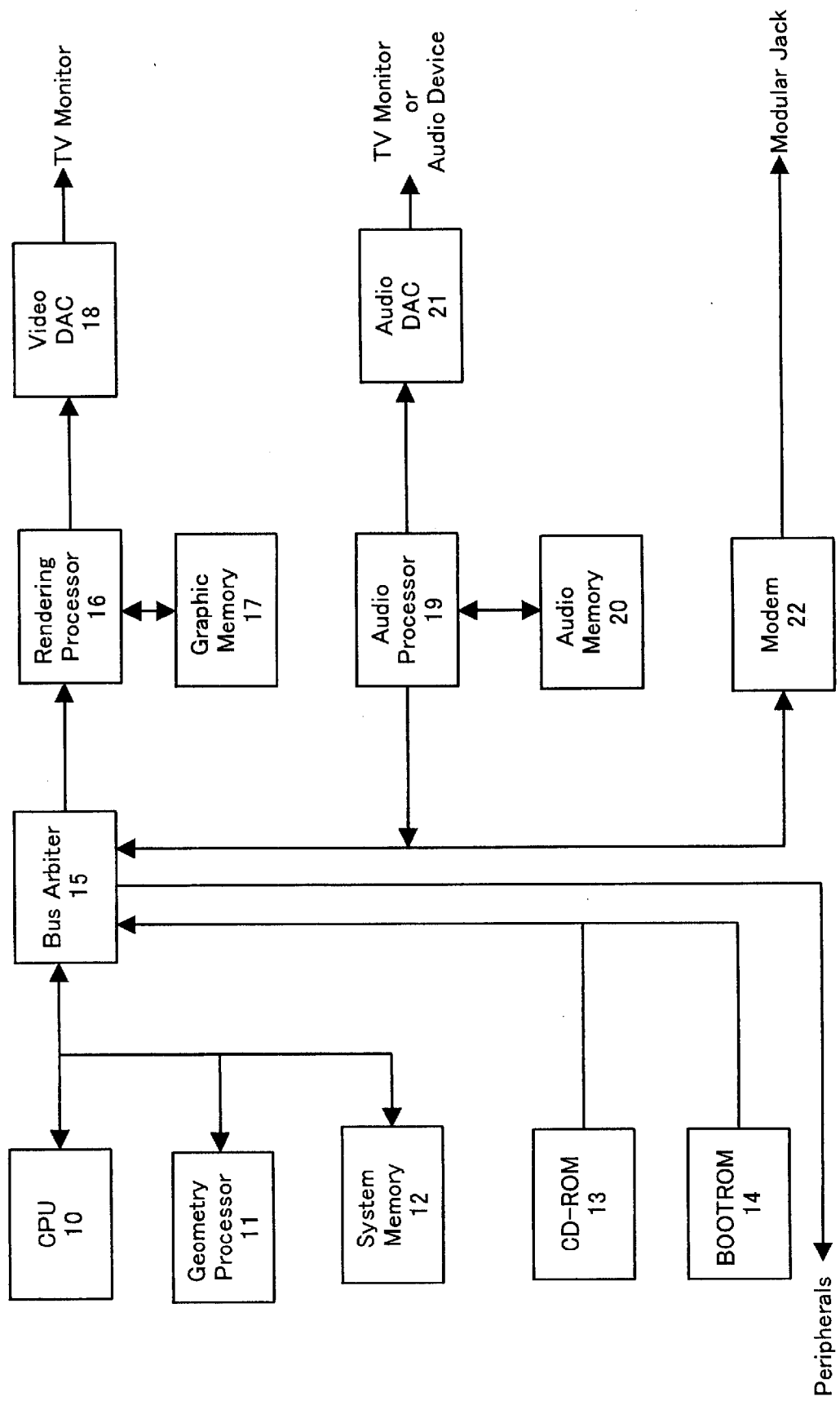
FIG. 2 is a block diagram depicting a home computer game device having a communication function.

FIG. 2 is a block diagram depicting a home computer game device having a communication function. The computer game device displays images generated by computer graphics (CG) technology on a monitor. In CG technology, an object arranged in a virtual three-dimensional space is comprised of a plurality of polygons, and a polygon is comprised of a plurality of pixels. On the monitor, an image when an object in each virtual three-dimensional space viewed from a predetermined view point coordinate is projected into a two-dimensional plane.

For this, the computer game device comprises a CPU 10 for controlling the entire system, a geometry processor 11 for performing geometric operation, a system memory 12 such as a work RAM, a CD-ROM 13 which is a recording medium where a game program is stored, a boot ROM 14 for starting up a game, a bus arbiter 15 for controlling buses, a rendering processor 16 for executing rendering, a graphic memory 17, a video DAC 18 for performing digital-analog conversion of graphic data, an audio processor 19, an audio memory 20, an audio DAC 21 for performing digital-analog conversion of audio data, and a modem 22 which is under the control of the bus arbiter 15.

In the communication game method of the present invention which is executed between the above mentioned computer game devices, a device calls up another device so as to influence a game progressing at the other device.

Figure 3:
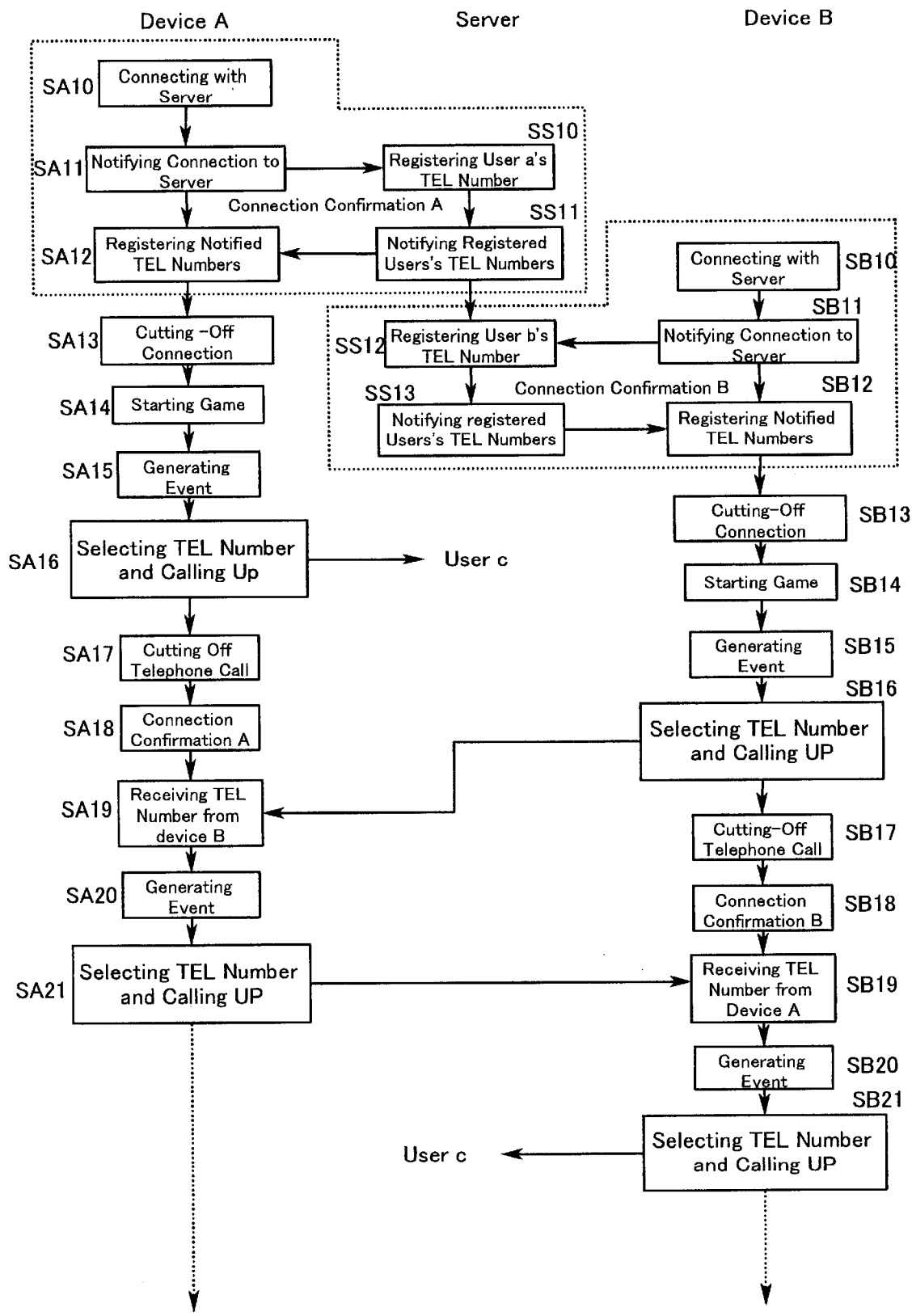
FIG. 3 is a flow chart depicting a communication game method in accordance with an embodiment of the present invention.

FIG. 3 is a flow chart depicting the communication game method in accordance with the present invention. In FIG. 3, the communication game method of the present invention is depicted with a communication game performed between a device A and a device B, as an example. The device A and the device B do not have to play the same game.

In the Step SA10, the user a calls up the server from the device A, and the device A connects with the server (enters communicating status). In the Step SA11, the device A notifies connection with the server to the server. In SS10, the server registers the telephone number of the user a (device A), and in step SS11, the server notifies the telephone numbers of all the users currently registered in the server to the device A. For example, it is assumed that the telephone number of the user c shown in FIG. 1 is notified at this time. In other words, the telephone number of the user c has been registered in the server before the telephone number of the user a. In the Step SA12, the device A registers the notified telephone number. Then in the Step SA13, the user a cuts-off the communication connection between the device A and the server.

The user b, on the other hand, makes a communication connection between the device B and the server after the telephone number of the device A is registered in the above Step SA10 (Step SB10), and the device B notifies connection to the server. In the Step SS11, the server registers the telephone number of the user b, and in the Step SS-12, the server notifies the telephone numbers of all the users currently registered to the server to the device B. The telephone numbers of the user c and a, for example, are notified at this time. In the Step SBI2, the device B registers the notified telephone number. Then in the Step SB13, the user b cuts-off communication connection between the device B and the server. The processing from the Step SA10 to the Step SA13 in the device A, and the processing in the Step SS10 and SS11 in the server are referred to as "connection confirmation A", and the processing from the Step SB10 to the Step SB13 in the device B, and the processing of the Step SS12 and SS13 in the server are referred to as "connection confirmation B".

Respective games are started in the devices A and B after connection with the server is cut-off (Steps SA14, SB14). To simplify the explanation, it is assumed that the device A starts the game before the device B, and the device A also executes each step to be described below before the device B. The game progresses as the game program read from the CD-ROM 13 is executed according to the control of the CPU 10. The games to be executed in each device are, for example, a role playing game (RPG) and a pet keeping game, and are not limited to certain game content.

In the Steps SA15 and SB15, an event is generated in games progressing in the devices A and B. This event is a change generated during progress of the games, such as the appearance of a new enemy in a role playing game, or the hatching of a pet from an egg in a pet keeping game. When an event is generated, the device A calls up the user c in the Step SA16, in other words, sends a call signal to the device C. The device B also calls up the user a, in other words, sends a call signal to the device A. The telephone call processing of the devices A and B is executed under the control of the CPU 10 according to the execution of the game program. If a plurality of telephone numbers are registered in the Steps SA12 and SB12, one of these telephone numbers is selected. The telephone number may be selected at random or may be selected sequentially in the sequence of registration.

And, as described later, the devices A and B only call up the communication partner, devices C and A respectively, and in the Steps SA17 and SB17, telephone call is cut-off before entering communicating status. The devices C and A do not respond even if called up. When a call signal is received, the device C generates an event in a progressing game by executing the game program under the control of the CPU 10. For example, the egg hatches when the pet keeping game is executed and the pet is still in an egg in the game running in the device C.

When the device A receives the call signal from the device B in the Step SA19, an event is generated in the game progressing in the device A in the Step SA20.

When the event is generated in the device A, the device A selects one of the registered telephone numbers and calls the number in the Step SA21. If the user b is selected, for example, the device A sends the call signal to the device B.

The device B receives the call signal from the device A in the Step SBI9. Then as above, an event is generated in the game progressing in the device B in the Step SB20. When the event is generated in the device B, the device B selects one of the registered telephone numbers and calls that number in the Step SB21. In FIG. 3, for example, the device B sends the call signal to the device C.

In this way, in the communication game of the present embodiment, an accidental event is generated independently from the progress of the game when a telephone call signal is received, in addition to a spontaneous event which is generated according to the progress of the game. If an event is generated in a device, an event is generated to a game progressing in another device by calling the other device. Therefore, the user of the game can experience a joy which an ordinary game cannot provide, or a thrill which no one can predict will happen.

When a device calls up another device, the telephone call is cut-off before entering communicating status with the other device, so communication cost is not charged. Since cost for communication is free, the user can enjoy a communication game at low cost.

In FIG. 3, the above connection confirmations for A and B may be performed periodically or according to instructions by the user during progress of the game in the devices A and B (Steps SA18, SB18). This is for acquiring new telephone numbers registered in the server after registration in the Steps SA12 and SB12. For example, the first device which was registered in the server cannot make a telephone call since no other devices are registered. However, the telephone numbers of communication partners can be acquired by confirming connection on occasion during progress of the game. Even for a device which has acquired a certain number of telephone numbers, the number of telephone numbers can be increased by confirming connection during the progress of the game. For example, the device A acquires the telephone number of the user b by the Step SA18.

Figure 4:
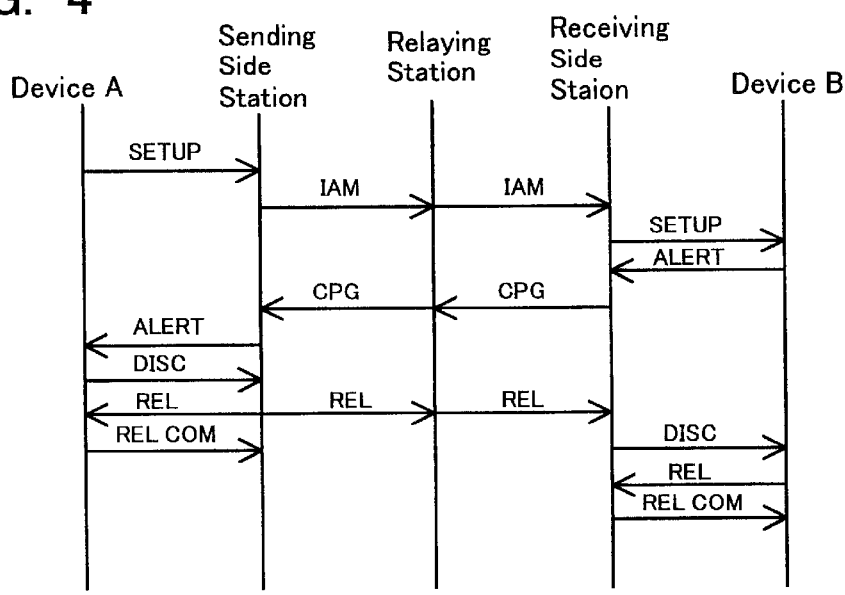
FIG. 4 is a diagram depicting a communication procedure between game devices in accordance with an embodiment of the present invention.

FIG. 4 is a diagram depicting a communication procedure between game devices in accordance with the present invention. FIG. 4 depicts a case when the device A calls up the device B. The signals transmitted between the device A and device B are relayed by, for example, a sending side station which is a switch at the device A side, a receiving side station which is a switch at the device B side, and a relaying station which is a switch to relay the sending side station and the receiving side station. The communication procedure in FIG. 4 is an example when ISDN (Integrated Services Digital Network) is used.

In FIG. 4, the device A sends a call setting signal (SETUP message) where the telephone number of the device B is specified to the sending side station. The sending side station sends an address signal (IAM message) corresponding to the SETUP message to the receiving side station via the relaying station. When the IAM message is received, the receiving side station sends the call setting signal (SETUP message) to the device B. This SETUP message to the device B is received by the device B as a call signal from the device A, and this generates an event in the game progressing in the device B.

When the SETUP message is received, the device B starts calling. The device B, which started calling, sends a busy signal (ALERT message) to the receiving side station. When the ALERT message is received, the receiving side station sends a call progress signal (CPG message) to the sending side station via the relaying station. When the CPG message is received, the sending side station sends a busy signal (ALERT message) to the device A. The device A receives this ALERT message, by which the device A can recognize that the device B received the call signal.

When the ALERT message is received, the device A sends a disconnection signal (DISC message) to the sending side station. When the DISC message is received, the sending side station sends a release signal (REL message) to the device A. At this time, the device A sends a release completion signal (REL COM message) to the sending side station. By this, disconnection processing at the device A side completes. The sending side station sends a release signal (REL message) to the receiving side station via the relaying station. When the REL message is received, the receiving side station sends a disconnection signal (DISC message) to the device B.

The device B normally responds to the above mentioned SETUP message, and enters communicating status by this response. In the present embodiment, however, the device B does not respond to the SETUP message during the progress of the game. So, the device B continues sending the ALERT message until the DISC message is received. And when the DISC message is received, the device B stops sending the ALERT message and sends a release signal (REL message). When the REL message is received, the slave station sends a release completion signal (REL COM message) to the device B. By this, disconnection processing at the device B side completes.

In this way the device A sends a call signal to the device B, and after the device B receives the call signal, the device A and device B are disconnected without entering communicating status. Because of this, an event can be generated in the game progressing in the remote device B free of communication cost.

The content of an event to be generated has been stored in the game program in advance. And, the content of the event is created according to the content of the game and the progress of the game. In the case of a role playing game, for example, an event of a sudden appearance of an enemy or an event to increase the weapons of a hero may be generated. A plurality of event contents may be set for one event so that an arbitrary event content can be selected. For example, a plurality of event contents, "appearance of an enemy" and "addition of weapons" are set as event contents in a certain progress status of the game, and one of these event contents is selected at random.

It is also possible to apply "caller ID service", currently provided by communication companies, to the communication game method of the present invention. If the "caller ID service" is used, the telephone number information of the transmission side device is added to the above mentioned call signal. And, the reception side device uses the numbers of the telephone number included in the received call signal. For example, when a plurality of event contents have been set, as mentioned above, a different event content is selected according to the telephone number of the received call signal by correlating these event contents to the lowest one digit of the telephone number.

Figure 5:
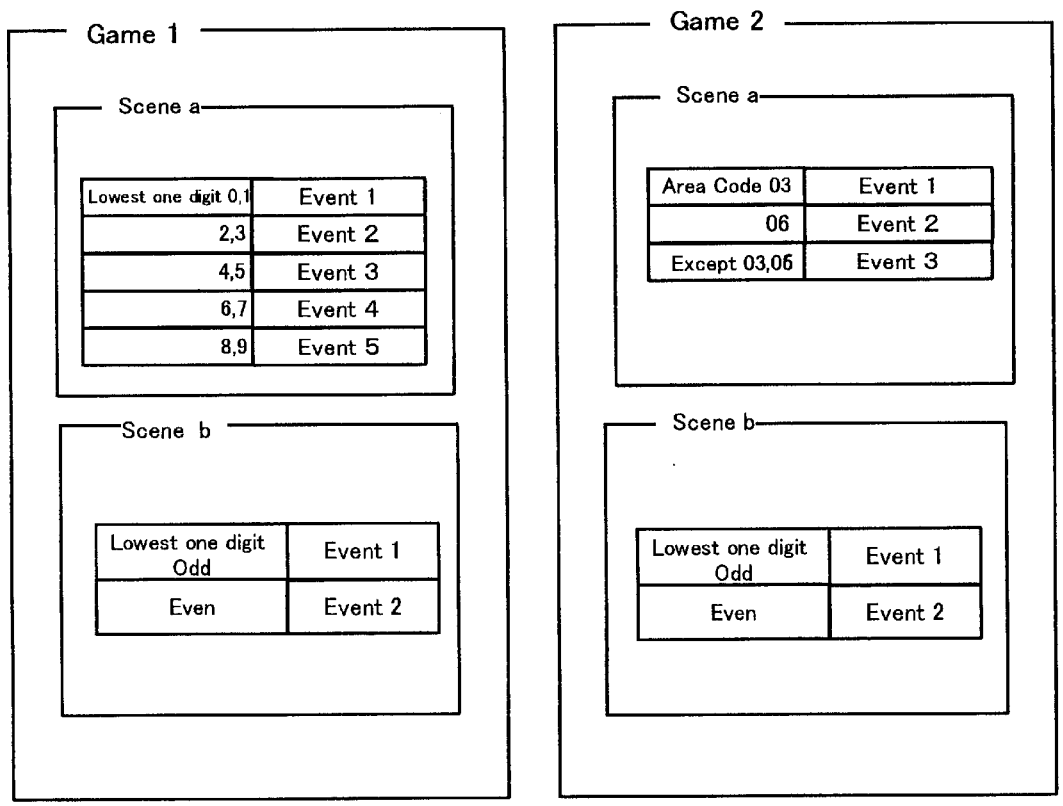
FIG. 5 is a diagram depicting the setting of event content.

FIG. 5 is a diagram depicting the setting of the event contents. FIG. 5 shows event content settings corresponding to the scenes a and b of the two games, 1 and 2 respectively. As FIG. 5 shows, it is preferable that a plurality of event contents is set depending on the game content (role playing game, pet keeping game, etc.), and depending on the progress status of the game (scene) (which game level the user is playing, whether the pet hatched from an egg, etc.). If the "caller ID service" is used, at least one number of the telephone number is assigned to each event content, and an event content corresponding to the telephone number of the received call signal is selected. If the "caller ID service" is not used, an event content is selected at random.

The telephone number to be used is not limited to the lowest one digit. Area code, the lower two digits and a combination of various other numbers can be used.

When the "caller ID service" is used, connection confirmation during the progress of the game is not always necessary. If the telephone number of the call placed to a game device is a telephone number not registered in the device, the telephone number can be registered at that time so as to increase the number of communication partners to send a call signal.

If a service to add such information as characters and symbols (e.g. an individual's name, address), and not a telephone number, to a call signal is implemented, the event content may be selected corresponding to these characters and symbols.

According to the present invention, an accidental event is generated independently from the progress of the game when the game device receives a telephone call signal, in addition to a spontaneous event which is generated according to the progress of the game. If an event is generated in a game device, an event is generated to a game progressing in another game device by calling the other game device. Therefore, the user of the game can experience a joy which an ordinary game cannot provide, or a thrill which no one can predict will happen.

After the call signal is transmitted/received, the telephone call is disconnected before the game devices enter communicating status, so communication cost is not charged. Since cost for communication is free, the user can enjoy a communication game at low cost.

The protective scope of the present invention is not limited to the above embodiments, but covers the invention stated in the Claims and equivalent embodiments thereof.

What is claimed is:

1. A game method executed by a first game device communicable with at least one different game device, wherein each game device includes a communications means and a controlling means, said at least one different game device includes at least a second game device, and each game device executes an independent game, the method comprising the steps of:

said communicating means in said first game device receiving a call signal from said second game device; and said controlling means in said first game device generating an event to a game that is progressing in said first game device based on the reception of the call signal.

2. The communication game according to claim 1, further comprising the step of:

said communication means in said first game device transmitting a call signal to said second game device when an event is generated to the game that is progressing in said first game device.

3. The communication game method according to claim 2, further comprising the step of:

said controlling means in said first game device acquiring a telephone number of said second game device for transmitting the call signal.

4. The communication game method according to claim 3, wherein if said controlling means in said first game device acquires telephone numbers of a plurality of different game devices, said communication means in said first game device transmits the call signal to an arbitrary game device selected from the plurality of different game devices.

5. The communication game method according to claim 1, wherein if a plurality of events are set, said controlling means in said first game device selects an arbitrary event from the plurality of events and generates the selected event.

6. The communication game method according to claim 1, wherein if a plurality of events are set, said controlling means in said first game device selects one of the plurality of events based on an information included in the received call signal.

7. The communication game method according to claim 6, wherein the information includes a telephone number of the first game device that transmits the call signal.

8. A computer program product executed by a first game device communicable with at least one different game device, wherein said at least one different game device includes a second game device, and each game device executes an independent game, the computer program product causing execution of a method comprising the steps of:

receiving a call signal from said second game device; and generating an event to a game that is progressing in said first game device based on the reception of the call signal.

9. The computer program product according to claim 8, wherein said method further comprises the step of:

transmitting a call signal to said second game device when an event is generated to the game that is progressing in said first game device.

10. The computer program product according to claim 9, wherein said method further comprises the step of:

acquiring a telephone number of said second game device for transmitting the call signal.

11. The computer program product according to claim 10, wherein if said first game device acquires telephone numbers of a plurality of different game devices, said first game device transmits the call signal to an arbitrary game device selected from the plurality of different game devices.

12. The computer program product according to claim 8, wherein if a plurality of events are set, said first game device selects an arbitrary event from the plurality of events and generates the selected event.

13. The computer program product according to claim 8, wherein in said method if a plurality of events are set, said first game device selects one of the plurality of events based on an information included in the received call signal.

14. The computer program product according to claim 13, wherein the information includes a telephone number of the first game device that transmits the call signal.

15. A game device for executing a game comprising:

a communication unit for receiving a call signal from a different game device through a network, whereby an independent game is progressing in each game device; and a controller for generating an event to a game that is progressing in said game device based on the reception of the call signal.

16. The game device according to claim 15, wherein said controller acquires a telephone number of a different game device and said communication unit transmits a call signal to said different game device when an event is generated to the game that is progressing in said game device.

17. The game device according to claim 16, wherein if said controller acquires a plurality of telephone numbers of different game devices, said controller selects one of the telephone numbers arbitrarily.

18. The game device according to claim 15, wherein if a plurality of events are set, the controller selects one of the plurality of events arbitrarily.

19. The game device according to claim 15, wherein if a plurality of events are set, the controller selects one of the plurality of events based on a information included in the received call signal.

20. The game device according to claim 19, wherein the information includes a telephone number of the game device that transmits the call signal.

* * * * *